United States Patent [19]
Frye

[11] Patent Number: 5,466,479
[45] Date of Patent: Nov. 14, 1995

[54] FAT AND OIL REPLACEMENTS AS HUMAN FOOD INGREDIENTS

[75] Inventor: Cecil L. Frye, Midland, Mich.

[73] Assignee: Dow Corning Corporation, Midland, Mich.

[21] Appl. No.: 750,848

[22] Filed: Aug. 27, 1991

Related U.S. Application Data

[63] Continuation of Ser. No. 252,415, Sep. 30, 1988, abandoned, which is a continuation-in-part of Ser. No. 862,175, May 12, 1986, abandoned, which is a continuation-in-part of Ser. No. 743,171, Jun. 10, 1985, abandoned.

[51] Int. Cl.⁶ ............................................ A23D 9/0007
[52] U.S. Cl. ........................ 426/611; 426/804; 252/49.6
[58] Field of Search ............................... 426/534, 545, 426/601, 609, 580, 582–583, 565, 570, 549, 622, 625, 637, 633, 643, 644, 603, 611, 804; 252/49.6

[56] References Cited

U.S. PATENT DOCUMENTS

| | | | |
|---|---|---|---|
| 519,980 | 5/1894 | Winter | 426/601 |
| 1,417,893 | 5/1922 | Ellis | 426/601 X |
| 1,701,580 | 2/1929 | Matti | 426/19 |
| 2,054,072 | 9/1936 | Ellis | 426/601 |
| 3,558,331 | 1/1971 | Tarika | 426/90 |
| 3,647,749 | 3/1972 | Zaweski et al. | 426/545 X |
| 4,062,785 | 12/1977 | Nibert | 426/609 |
| 4,430,235 | 2/1984 | Chu | 252/49.6 |

*Primary Examiner*—Carolyn Paden
*Attorney, Agent, or Firm*—Robert L. McKellar

[57] ABSTRACT

What is disclosed are food compositions for human consumption wherein polysiloxanes are substituted for all or part of the organic fats and oils in the food. An example of such a food composition is a blueberry muffin prepared by substituting a polyorganosiloxane having the formula $(CH_3)_3SiO\{(CH_3)_2SiO\}_b Si(CH_3)_3$ for the fats and oils in the blueberry muffin batter mix.

54 Claims, No Drawings

FAT AND OIL REPLACEMENTS AS HUMAN FOOD INGREDIENTS

This application is a continuation of application Ser. No. 07/252,415, filed on Sep. 30, 1988, now abandoned, which is a continuation-in-part of application Ser. No. 06/862,175, filed on May 12, 1986, now abandoned, which is a continuation-in-part of application Ser. No. 06/743,171, filed Jun. 10, 1985, now abandoned.

BACKGROUND OF THE INVENTION

This invention deals with fat and oil replacements in human foods. Scientists from many sectors are spending a great deal of their time trying to develop materials that can be introduced into the human food chain. These materials are being developed in response to numerous investigations and reports regarding human consumption, and the impact of such consumption, of natural fats and oils by the human population.

These investigations and reports have documented and established that certain, widely consumed, fats and oils are detrimental to human health and should be removed from or severely reduced in human diets.

The edible fats and oils in the food we eat are widely distributed in nature. They are derived from vegetable, animal and marine sources and are often by-products in the production of vegetable proteins and the like. Fats and oils have been extracted and used for centuries as soaps, detergents, raw materials, antifoams, lubricants, food and fuels.

The chemical structures of fats are very complex owing to the many combinations and permutations of fatty acids that can be esterified at the three hydroxyl groups of glycerol. These materials, generically known as triglycerides, are named according to the parent acids that are used to esterify the glycerol. For example,

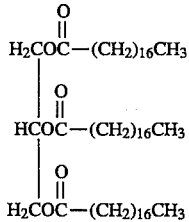

Many naturally occurring fats and oils are made up of fatty acids with chain lengths greater than twelve carbon atoms. A vast majority of such fats and oils are made up of chain lengths of sixteen carbons or greater. Most of the variable chemical and physical properties result from the effects of the various fatty acids esterified with glycerol.

Diets that are high in red meats lead to the ingestion of large quantities of saturated fats and generally, vegetable oils are a source of polyunsaturated fats and oils, such polyunsaturated fats and oils being modified by hydrogenation to provide commercial food products which are monounsaturated and saturated fats and oils. Investigators have strongly urged a direct link between high intake of monounsaturated fats and saturated fats and cardiovascular diseases and certain human cancers.

One report has suggested an "alarming" change in the diets of the affluent portion of the world in which per capita dietary fat intake has increased to an all time high, mostly in the form of saturated fats from red meat and, the greater portion from the modified fats and oils known as the "separated" fats and oils such as margarine, vegetable oils, shortenings, salad oils, cooking oils, and the like. The ingestion of these fats and oils raises blood cholesterol levels which leads to some of the cardiovascular diseases alluded to supra.

In addition to the problems discussed above, there is the very serious health problem of obesity itself. Part of the program to relieve or avoid obesity is to provide dietary foods which are low in calories and since the fats and oils described above provide a major, and largely discretionary source of calories, it would be beneficial if the fats and oils could be replaced with low calorie or no calorie substitutes. This obesity problem extrapolates directly to persons who aren't really clinically/technically obese but who are "overweight" and also to those who aren't overweight but desire to attain and maintain the "slim look". To these people, low calorie or no calorie fats and oils would also be desirable.

Attaining a low calorie or no calorie food is not an easy task. Currently, there is not a low calorie fat and oil commercially available. Typically, low calorie or diet foods are obtained by reducing the sugar content or essentially eliminating the sugar and using artificial sweeteners such as saccharin, aspartame, cyclamates, L-sugars and the like.

Substitute fats and oils have been described by Hamm, D. J., Journal of Food Science, vol. 49 (1984) page 419, as trialkoxytricarballylate, trialkoxycitrate, trialkoxyglycerylether, Jojoba oil and sucrose polyester, the latter material currently being the oil of choice. Sucrose polyester has been described by Jandacek, Ronald J., et al., American Journal of Clinical Nutrition 33, February (1980) page 251, as a mixture of hexa-, hepta-, and octaesters of sucrose, which is prepared by esterifying sucrose with long chain fatty acids.

Desirable features in would-be substitute oils and fats are: a) resistance to digestion (to achieve the low calorie or no calorie effect); b) the anticholesterol effects; c) chemical and biological inertness; d) thermal stability, especially high thermal stability for cooking uses; e) other functional and physical properties comparable to or superior to natural fats and oils, especially in terms of end use such as, for example, lending texture to cakes, enhancing flavors, enhancing taste, or at least not contributing to undesirable taste, consistency, and so forth. The substitute fats and oils should not have a strong laxative effect such as is known in some of the natural fats and oils; should not degrade under high heat, such as thermal oxidation during deep frying; should not degrade under biological conditions in the body, for example should not degrade to long chain alcohols or some other cytotoxic chemicals and, the substitute fats and oils should be fairly inexpensive because not only should the food item prepared with the substitute fat or oil have organoleptic acceptability but it must be affordable.

The compositions of this invention provide a means for resolving the aforementioned problems, in that, the incorporation of certain silicones as substitutes for fat and oils, the use of certain silicones as edible food products, and the use of certain silicones in the preparation of foods, where the intent is to ingest the silicones as a significant portion of the diet, resolves many of the aforementioned problems without detracting from the bulk of the diet. This can be accomplished while maintaining, and in some cases, enhancing the organoleptic properties of the food without the commensurate potential calorie problems associated with natural fats and oils or some of the newer, synthetic, organic candidate fat and oil substitutes.

Numerous studies in various animal species (rats, mice, rabbits, dogs and monkeys) have established the safety and essentially innocuous nature of polydimethylsiloxanes and related silicones. Studies with C-14 labeled materials have shown that adequately devolatilized silicone polymers are not absorbed from the gastro-intestinal tract, and that such materials are eliminated in the fecal contents.

Additional evidence of recent rat-feeding studies is provided by Hashim et al., "*Effect of Phenylmethylsiloxanes, A Potential Non-Caloric Fat Substitute On Body Composition Of Obese Zucker Rats*", Bracco, E. F., Baba, N. and Hashim, S. A, Dept. of Medicine, St. Luke's Roosevelt Hospital Center and Columbia University College of Physicians and Surgeons, New York, N.Y., who have shown that significant loss of weight can be obtained by diluting a conventional low fat rat chow with a commercial phenylmethylsiloxane. They observed good acceptance when fed ad libitum, apparent satiety as evidenced by the absence of significant compensation by over-eating, and no evidence of adverse physiological effects such as excessive anal leakage/diarrhea or damage to intestinal mucosae even when the diet contained up to 22 weight percent of the phenylmethylsiloxane.

Consequently, polydimethylsiloxanes have been widely used for applications involving food processing and food contact. These applications, which have included release coatings, defoaming, anti-oxidant, etc., have resulted in foods containing at most parts per million levels of silicone.

A book written by Weiss, T. J., *Food Oils and Their Uses*, [AVI Publishing Co., Inc., Westport, Conn., 1983, on page 112,] reviews articles suggesting various ppm uses for silicones in association with food. Under the section entitled "Antifoam Agents", Weiss disclosed that Babyan had shown that the presence of small amounts i.e. ppm quantities, of silicone oil in deep frying oil increased the smoke point of the oil by about 14° C. (25° F.) and that silicones (in 0.5 to 3 ppm quantities) when added to frying fats inhibit foam formation. It was further speculated in the reviewed articles that larger quantities of such silicone oils (50–100 ppm) may even cause foaming of the frying fat where it is not ordinarily expected. The suggestion is also presented there that the silicone antifoams may be deleterious in cakes, in frying doughnuts and in manufacturing potato chips, all in an antifoaming, i.e. ppm, context. Thus, it would appear rather dubious from Weiss's reasoning that silicones could be very useful in foods at the pph levels.

Certain other non-silicone low calorie fat substitutes have been disclosed in the prior art in U.S. Pat. No. 3,600,186, issued Aug. 17, 1971 to Mattson, et al.; U.S. Pat. No. 3,954,976, issued May 4, 1976 to Mattson, et al.; U.S. Pat. No. 4,005,196, issued Jan. 25, 1977 to Jandacek, et al.; U.S. Pat. No. 4,034,083, issued Jul. 5, 1977 to Mattson and, U.S. Pat. No. 4,461,782, issued Jul. 24, 1984 to Robbins, et al.

None of these references, either singly or in combination, show or even suggest the compositions of this invention.

THE INVENTION

It is accordingly one object of this invention to provide food compositions for human consumption which contain certain silicones.

A further object of this invention is the use of certain silicones in the preparation of edible food products or as components (ingredients) in edible food products.

Other objects and advantages will become apparent through a reading of the entire specification and claims.

Thus there is provided by the instant invention a food composition for human consumption containing 0.1 to 100 weight percent, based on the total food composition, of polyorganosiloxanes, said polyorganosiloxanes having organic carbon contents of at least fifteen weight percent, wherein the carbon is linked to silicon by silicon-carbon bonds; said polyorganosiloxanes having average molecular weights of at least 500 grams/mole and having the general formula

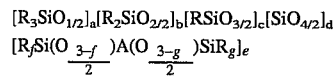

wherein each R is individually selected from the group consisting of
(i) $C_6H_5$—;
(ii) $CH_2=CH$—;
(iii)

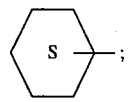

(iv) alpha phenylethyl;
(v) beta phenylethyl;
(vi) alkyl groups of 1 to 20 carbon atoms;
(vii) hydrogen;
(viii) hydroxyl;
(ix) $R'(CH_3)_2SiO$—;
(x) $R'OOC(CH_2)_h$
wherein each R' is individually selected from the group consisting of hydrogen, an alkyl radical of 1 to 20 carbon atoms and $C_6H_5$—, wherein h is an integer of from 2 to 10;
(xi) $R''O(C_2H_4O)_n(C_3H_6O)_m(CH_2)_p$——;
wherein n and m each have an average value of from 1 to 25 and p is an integer of from 2 to 6, and R" has the same meaning as R, above;
(xii) $R''O(C_2H_4O)_n(CH_2)$——;
(xiii) $R''O(C_3H_6O)_m(CH_2)$——;
wherein in each case, n and m each have an average value of from 1 to 25 and R is an integer of from 2 to 6, and R" has the same meaning as R, above, and,
(xiv) 2-phenylpropyl;
A is a hydrolyrically stable divalent hydrocarbon radical attached to two silicon atoms by silicon-carbon bonds; a, b, c, d, e, f, and g have mole fraction values respectively ranging from 0-1, 0-1, 0-1, 0-0.75, 0-1, 0-3, and 0-3.

Also provided is a method of preparing food using certain silicones wherein there is used, in such preparation, polyorganosiloxanes having organic carbon contents of at least fifteen weight percent, wherein the carbon is linked to silicon by silicon-carbon bonds; said polyorganosiloxanes having molecular weights of at least 500 g/mole and having the general formula

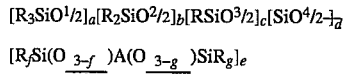

wherein each R is individually selected from the group consisting of
(i) $C_6H_5$—;
(ii) $CH_2=CH$—;

(iii)

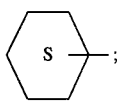

(iv) alpha phenylethyl;
(v) beta phenylethyl;
(vi) alkyl groups of 1 to 20 carbon atoms;
(vii) hydrogen;
(viii) hydroxyl;
(ix) R'(CH$_3$)$_2$SiO—;
(x) R'OOC(CH$_2$)$_h$
wherein each R' is individually selected from the group consisting of hydrogen, an alkyl radical of 1 to 20 carbon atoms and C$_6$H$_5$—, wherein h is an integer of from 2 to 10;
(xi) R"O(C$_2$H$_4$O)$_n$(C$_3$H$_6$O)$_m$(CH$_2$)$_p$—;
wherein n and m each have an average value of from 1 to 25 and p is an integer of from 2 to 6, and R" has the same meaning as R, above;
(xii) R"O(C$_2$H$_4$O)$_n$(CH$_2$)—;
(xiii) R"O(C$_3$H$_6$O)$_m$(CH$_2$)—;
wherein in each case, n and m each have an average value of from 1 to 25 and p is an integer of from 2 to 6, and R" has the same meaning as R, above, and,
(xiv) 2-phenylpropyl;
A is a hydrolytically stable divalent hydrocarbon radical attached to two silicon atoms by silicon-carbon bonds; a, b, c, d, e, f, and g have mole fraction values respectively ranging from 0-1, 0-1, 0-1, 0-0.75, 0-1, 0-3, and 0-3.

The food compositions contemplated herein are those food compositions which are ingestible by humans and in which the silicones described herein are substituted wholly, or in part, for the fats and oils normally used in such food compositions. Included, therefore, by way of example, are dairy products, baked goods, mayonnaise, sandwich spreads, peanut butter, cereals and the like.

Also, some of the food compositions contemplated herein are those food compositions which are entirely, or nearly entirely composed of the silicones. Included, therefore, by way of example, are salad oils and shortenings.

Also, food compositions contemplated herein are those food compositions which are prepared by the use of silicone fluid frying oils such as, for example, deep fried fish, vegetables, meats, potatoes fried foods and the like.

It is also contemplated within the scope of this invention to include frying oils and the like which contain silicones as partial substitutes for the organic oils and fats.

Not included in this invention are silicones which become part of foods at very low levels, i.e. substantially less than 0.1 weight percent, such as silicone based antifoams, release coatings in bakery goods, and the like.

For purposes of this invention, the silicones can be described as polyorganosiloxanes. Aside from the purity expected in food grade substances, the polyorganosiloxanes of this invention are those which have an organic carbon content of at least fifteen (15) weight percent. Thus, included within the scope of this invention are those siloxanes having organic substitution wherein the organic substitution is linked to the silicon atom through a carbon/silicon bond. Such a limitation distinguishes the siloxanes useful in this invention from those wherein there is no organic substitution such as partial hydrolyzates and condensates of Si(OR)$_4$ wherein R is an alkyl radical. Further, this invention contemplates small amounts of —Si—O—C— bonded materials wherein the hydrolyzable by-products of such materials are not physiologically highly toxic to the human body, such as, for example, ethanol, glycerol, sucrose and other organic sugars. For example,

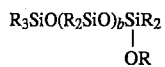

wherein —OR is CH$_3$CH$_2$O—, when hydrolyzed would give ethanol as a by-product and

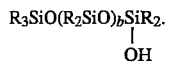

In order to minimize the possibility of absorption of the siloxanes in the stomach or intestines when the siloxanes are ingested, the siloxanes are preferred, for purposes of this invention, to have a molecular weight of at least 500 g/mole. What is meant by having a molecular weight of at least 500 g/mole is that the compositions should not contain significant amounts of material with molecular weights of less than 500 g/mole. By "significant", it is meant that there should be less than about 10 weight percent of such low molecular weight materials present in the composition, based on the total silicone present.

Preferred for this invention are silicones that are essentially free of such low molecular weight materials.

The siloxanes of this invention need not necessarily be truly soluble or miscible with the other components of the foods in which they are being used since most food systems are heterogeneous anyway. Some preferred materials are those showing the least solvency for oil soluble vitamins.

However, the siloxanes of this invention can be tailor-made to be compatible with such foods because of the ability to change the type of molecule and because the molecules can be substituted by many variable R groups as shown below.

The general formula for the siloxanes useful in this invention has been set forth above and it should be noted that R can be individually selected from the group consisting of
(i) C$_6$H$_5$—;
(ii) CH$_2$=CH—;
(iii)

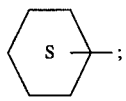

(iv) alpha phenylethyl;
(v) beta phenylethyl;
(vi) alkyl groups of 1 to 20 carbon atoms;
(vii) hydrogen;
(viii) hydroxyl;
(ix) R'(CH$_3$)$_2$SiO—;
(x) R'OOC(CH$_2$)$_h$,
wherein R' is individually selected from the group consisting of hydrogen, an alkyl radical of 1 to 20 carbon atoms and C$_6$H$_5$—, wherein h is an integer of from 2 to 10;
(xi) R"O(C$_2$H$_4$O)$_n$(C$_3$H$_6$O)$_m$(CH$_2$)$_p$
wherein n and m each have an average value of from 0 to 25 and p is an integer of from 2 to 6; a, b, c, d, e, f and g have mole fraction values respectively ranging from 0-1, 0-1, 0-1, 0-0.75, 0-1, 0-3 and 0-3.

Thus, the siloxanes can be polyorganosiloxanes or can be polyorganosiloxane-organic copolymers.

Further, A is a hydrolytically stable divalent hydrocarbon radical which is linked to silicon atoms by silicon-carbon bonds. Thus, these siloxanes can be alkylene-bridged polymers.

The values of a, b, c, d, e, f, and g, as mole fractions range respectively from 0-1, 0-1, 0-1, 0-0.75, 0-1, 0-3 and 0-3. Thus, contemplated within the scope of this invention are such polyorganosiloxanes as (I) $[R_3SiO_{1/2}]_{a=>0}[R_2SiO_{2/2}]_{b=>0}[RSiO_{3/2}]_{c=>0}[SiO_{4/2}]_{d=>0}$ $[R_fSi(O_{\frac{3-f}{2}})A(O_{\frac{3-g}{2}})SiR_g]_{e=>0};$ (II) $[R_3SiO_{1/2}]_{a=>0}[R_2SiO_{2/2}]_{b=>0}[RSiO_{3/2}]_{c=>0}[SiO_{4/2}]_{d=>0};$ (III) $[R_3SiO_{1/2}]_{a=>0}[R_2SiO_{2/2}]_{b=>0}[RSiO_{3/2}]_{c=>0};$ (IV) $[R_3SiO_{1/2}]_{a=>0}[R_2SiO_{2/2}]_{b=>0};$ (V) $HO[R_2SiO_{2/2}]_{b>0}H;$ (VI) $HO[R_2SiO_{2/2}]_{b=>0}[RSiO_{3/2}]_{c=>0}H;$ (VII) $HO[R_2SiO_{2/2}]_{b=>0}[RSiO_{3/2}]_{c=>0}[SiO_{4/2}]_{d=>0}H$ and, (VIII) $HO[R_2SiO_{2/2}]_{b=>0}[RSiO_{3/2}]_{c=>0}[SiO_{4/2}]_{d=>0}[R_{f=>0}Si-$ $(O_{\frac{3-f}{2}})A(O_{\frac{3-g}{2}})SiR_g]_{e=>0}H$ Preferred for this invention are the polyorganosiloxanes (I) through (VIII) wherein the R groups are the lower alkyl groups. More preferred are the polyorganosiloxanes (I) through (VIII) wherein the R groups are methyl groups. Most preferred are the polyorganosiloxanes (II), (III) and (IV) wherein the R groups are methyl groups.

Also preferred for this invention are polyorganosiloxane-organic copolymers having the formulas (I) through (VIII) wherein some of the R groups are $R''O(C_2H_4O)_n(C_3H_6O-)_m(CH_2)_p$ and the preponderance of the R groups are methyl groups.

The most readily available commercial products for use in this invention are those polyorganosiloxanes having the general formula $$R_3SiO(R_2SiO)_bSiR_3$$

wherein R is independently selected from $CH_3-$, $CH_3CH_2-$, $C_6H_5-$, phenylethyls, and 2-phenylpropyl. Specifically, organopolysiloxanes which are highly preferred in this invention are those having the formula $(CH_3)_3SiO[(CH_3)_2SiO]_bSi(CH_3)_3$ wherein b has an average value of 25 to 500, resinous organopolysiloxanes having a degree of substitution (number of organic group substitution on each silicon atom) of 1.0 to 2.0 and are copolymers consisting of $SiO_2$ units, $(CH_3)_3SiO_{1/2}$ units, $CH_3SiO_{3/2}$ units and $Q(CH_3)_2SiO_{1/2}$ units, wherein Q is a radical selected from a group consisting of hydrocarbon groups consisting of carboxyl, ester, amide, amino, mercapto, nitrile, nitro, carbonyl, alkyl groups containing from 3 to 20 carbon atoms and polyalkylene oxide polymers and copolymers containing either singly or in combination polyoxethylene, polyoxypropylene and polyoxybutylene units.

Other readily available commercial products for use in this invention are those organopolysiloxane-organic copolymers having the average structural formulae $$R_jSiL[OSi(CH_3)_2]_k(OSiCH_3G)_rOSi(CH_3)_2Gl_{4-j}; \quad (1)$$

$$G(CH_3)_2Si[OSi(CH_3)_2]_k(OSiCH_3G)_lOSi(CH_3)_2G; \quad (2)$$

$$(CH_3)_3Si[OSi(CH_3)_2]_k(OSiCH_3G)_qOSi(CH_3)_3; \quad (3)$$

and $$R_jSiL[OSi(CH_3)_2]_k(OSiCH_3G)_qSi(CH_3)_3]_{4-j} \quad (4)$$

in which formulae R is a hydrocarbon radical and contains 1 to 10 carbon atoms; G is a radical of the structure—$D(OR'')_tT$ wherein D is a alkylene radical; R'' is composed of ethylene radicals and radicals selected from the group consisting of propylene and butylene radicals, the amount of ethylene radicals relative to the other alkylene radicals being such that the ratio of carbon atoms to oxygen atoms in the total OR'' blocks ranges from 2.3:1 to 2.8:1; t has an average value from 25 to 100; T is a radical selected from the group consisting of the OR', —OOCR' and —OC═OOR' radicals wherein R' is a radical selected from the group consisting of hydrocarbon and hydrocarbonoxy radicals, the T radical containing a total of less than eleven atoms;

j has an average value of from 0 to 1;
k has an average value of from 6 to 420;
r has an average value of from 0 to 30;
l has an average value of from 1 to 30; and
q has an average value of from 3 to 30;
said copolymers containing at least 13 percent by weight $OSi(CH_3)_2$ units based on the weight of the copolymer.

Preferred for this invention are types (2) and (3). Most preferred for this invention is type (3). It is preferred for this invention that low molecular weight alkylene oxide polymers not be present in significant quantities, for example, not greater than 10 weight percent based upon the amount of siloxane-polyalkylene oxide polymers used in the food composition. Further, less preferred materials are those wherein the polyalkylene oxide polymers and the siloxanes are connected by ═Si—O—C— bonds which are potentially hydrolyzable.

The food compositions herein which contain the polyorganosiloxanes generally contain such polyorganosiloxanes in a quantity of 0.1 to 100 weight percent based on the total food composition. The amount of polyorganosiloxane that is required depends on the type of food composition. For example, if one wishes to replace the natural butter fat in whole milk with the polyorganosiloxanes of this invention, the amount of polyorganosiloxane used would be on the order of 0.5–3 weight percent, while replacing the shortening used in the preparation of pie crust could amount to several times that required for whole milk. Obviously, in preparing a salad oil, the polyorganosiloxanes of this invention could constitute nearly 100% of such a food composition.

In using the organopolysiloxanes of this invention, one simply substitutes the organopolysiloxanes for all or some of the natural fat or oil of the food product. The method used often becomes one of conventional food preparation in which polyorganosiloxanes are simply added whenever the recipe calls for natural fats or oils.

Sometimes, however, since the polyorganosiloxanes of this invention are not exactly equivalent in all regards to the natural fats and oils in many foods, one may need to add more or less polyorganosiloxanes. For example, some fats and oils act as emulsifiers and, when such a property is required to prepare foodstuff, adjustments in the quantity of the polyorganosiloxane used are required in order to ensure that an emulsion results. Most of the polyorganosiloxanes of this invention are commercially available and therefore their preparation is well-known in the art and will not be set forth herein. For those polyorganosiloxanes that are not commercially available, their preparation can be found in the published literature, especially the patent literature.

Thus, methods contemplated within the scope of this invention include such diverse things as immersing foods in hot polyorganosiloxanes (i.e. deep frying); dressing food with polyorganosiloxanes (i.e. salad oil and salad dressing); frying foods using the polyorganosiloxanes as frying oils; production of dairy products such as cheese, cottage cheese, milk, ice cream, whipped cream and yogurt; production of baked goods such as cakes, pie crusts, cookies, bread, cereal, doughnuts and crackers; snackfoods such as potato chips, popcorn and corn chips; candy, icings, and other confections; shortening substitutes; margarine; mayonnaise; salad dressing; peanut butter; low calorie or no calorie foods and the like.

For purposes of this invention, "hydrolyrically stable" means that the C—Si and Si—O—Si bonds in the polyorganosiloxane are stable to conditions in which an XSi—O—CX bond is normally susceptible to hydrolytic cleavage.

"Major ingredients" for purposes of this invention means at least 2 percent by weight of the total food composition.

Now, so that those skilled in the art appreciate and understand the invention set forth in the claims hereto, the following examples are given.

Certain words used in the examples are set forth in the glossary below.

GLOSSARY

The following terms are used throughout this specification and they are defined as follows:

Crisco® is a registered trademark of Proctor and Gamble and the Crisco soybean oil used herein is food grade soybean oil.

Cuisinart® is a registered trademark of Cuisinart International, Greenwich, Conn.

Hamilton Beach (Scoville Division), Waterbury, Conn. Manufacturers of household appliances used in the examples.

Good Seasons®, General Foods Corporation. Brand of salad dressings used for comparison purposes in the examples.

Myvatex (2%)

Distilled glyceryl monostearate and distilled propylene glycol monostearate stearoyl lactylic acid, potassium sorbate, citric acid in hydrogenated vegetable shortening from Eastman Chemical Products, Kingsport, Tenn.

Sterolac (0.5%)

Sodium stearoyl-2-lactylate

Vanall (2%)

A hydrated blend of sorbitan monostearate, mono and diglycerides. Polysorbate-60, propylene glycol. Lactic acid and sodium proprionate. C. J. Patterson, Patco Co., 3947 Broadway, Kansas City, Mo. 64111.

Solkafloc 5% (Solka-floc BW-200) is a mechanically ground cellulose available from the Berlin Gorham Division of the Brown Co. 30–35 micron average particle size.

Baka-Snak of Modified Starch (5%) Pregelatinized, lightly modified waxy maize starch. National Starch Co., New York, N.Y.

Keojel 30—instant (5%)

Pregelatinized, modified waxy maize starch. The Hubinger Company, Keokuk, Iowa 52632.

Tween® 80

Polyoxyethylene (20) sorbitan monooleate U.S.P., ICI America, New York, N.Y.

Span® 20

Sorbitan monolaurate, ICI America

Monodisperse

Polysiloxanes are made up of molecules having a wide distribution of molecular weights and are referred to in the art as having "average" molecular weights. "Monodisperse" as used herein means that the polysiloxanes have a narrow distribution of molecular weights.

EXAMPLE 1

The Use of a Silicone Oil in a Common Food Product and the Comparison with Vegetable Oil Control Peanut butter was prepared using the formula of one cup of Planters® brand dry roasted peanuts and 1¾ tablespoons of soybean oil (foodgrade) from Crisco®.

(A.) The peanuts were ground up in a Cuisinart® brand food processor until they were fine-grained. One tablespoon of the vegetable oil was added and the processing was continued for a few seconds whereupon a butter-like material formed. An additional ¾ of a tablespoon of vegetable oil was added to the butter-like material and the butter was completely formed. The peanut butter was not as smooth as "national" brands of commercial peanut butter but was similar in taste and texture.

(B.) The above process was carried out except that 1½ tablespoons of a polyorganosiloxane having a viscosity of twenty centistokes and having the average formula

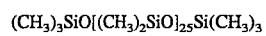

was substituted for the vegetable oil in (A.) and the silicone oil was added in ½ tablespoon increments. The result was a somewhat drier looking peanut butter which had a taste and texture similar to the product of (A.).

EXAMPLE 2

The Preparation of Mayonnaise Using a Silicone Oil

A control mayonnaise was prepared which had the following formula:

| 1 egg | 1 tablespoon lemon juice |
| ½ teaspoon dry mustard | 1 tablespoon vinegar |
| ¼ teaspoon paprika | 1 cup Crisco® vegetable oil |

The egg, mustard, paprika, lemon juice, vinegar and ¼ cup of vegetable oil were combined in a Hamilton Beach Scoville blender. The ingredients were throughly mixed at the "blend" setting for about 5 seconds. Three fourths of a cup of vegetable oil was then added slowly while continuing to blend. The mixture was blended for about ten seconds after the addition was complete.

The taste of the resulting product was quite bland compared to commercial mayonnaise because of the lack of salt in the formula. The consistency of the product was a bit less than the commercial product, but it was very acceptable. The appearance (coloring) was very close to commercial mayonnaise (off-white).

A second material was prepared as above except that the oil used consisted of ¼ cup vegetable oil added initially and ¾ cup of silicone oil as used in example 1 was added subsequently. After final blending, the product was indistinguishable in taste, consistency and appearance, from the control.

EXAMPLE 3

An attempt was made to substitute the silicone oil (as used in example 1) for all of the vegetable oil, in the preparation of mayonnaise. The formula used was the same as was used in example 2 except that the vegetable oil was entirely replaced by the silicone oil.

The procedure of example 2 was used and ¼ cup of polyorganosiloxane oil was first added, then subsequently, the remaining ¾ cup of polyorganosiloxane oil was added. The taste of this product was very similar to the above products while the overall consistency was slightly less than the above products, but very acceptable. The color was a significantly deeper yellow, indicating a color enhancement on the part of the silicone oil.

EXAMPLE 4

Use of a Silicone Oil in Popped Corn

Commercial popcorn (about ½ cup) was placed in an electrically heated skillet and wetted with a trimethylsiloxy-endblocked-polydimethylsiloxane fluid having an average formula of $(CH_3)_3SiO[(CH_3)_2SiO]_{67}Si(CH_3)_3$. The skillet was heated to 175° C. and held there until almost all of the corn had popped. The corn was successfully popped without burning and when the product was flavored using a commercial butter flavored salt, it was crisp and tasty.

EXAMPLE 5

A salad dressing based on a silicone fluid was prepared by mixing Good Seasons® brand dry mix Italian style, with vinegar and a silicone oil, The silicone oil is a trimethylsiloxyendblocked-polydimethylsiloxane having the formula found in example 1. Normally, the ratio of such vinegar:water:vegetable oil mixture is about 10:15:75 by volume. The vinegar and water are mixed, the dry mix is added and shaken and then the vegetable oil is added and the total shaken to provide a poor dispersion.

When using a silicone oil as described above, the ratio vinegar:water:oil is about 10:15:50, a much more stable dispersion is formed, which can be used in place of the conventional salad oil and vinegar dressing.

EXAMPLE 6

General food items were deep fried using a trimethylsiloxy-endblocked polydimethylsiloxane fluid as found in Example 4. The food items were:

| | |
|---|---|
| French fries | Egg rolls |
| Potato skins | Beef Steak |
| Chicken parts | Char Sui |
| Fish | Fish cakes |
| Won tons | Onion rings |

Each of the items cooked quickly, had an aesthetically pleasing appearance, did not burn, and were not excessively "greasy". The taste was excellent in each case. When a siloxane oil having the average formula $(CH_3)_3SiO[(CH_3)_2SiO]_{135}Si(CH_3)_3$ was substituted for the first siloxane oil, the results are essentially the same.

EXAMPLE 7

Food items are stir-fried in a Chinese Wok cooker using the fluids identified in example 6. The food items were

| | | |
|---|---|---|
| Meat | Bok chow | Carrots |
| Poultry | Bean Sprouts | Green Peppers |
| Shrimp | Mushrooms | Onions |
| Broccoli | Water Chestnuts | Apples |
| Pea pods | Nuts | Tomatoes |
| Beans | Celery | |

These items were cooked quickly, the vegetables retained good color and the items were tasty.

EXAMPLE 8

Standard white layer cakes were prepared using the American Association of Cereal Chemists method 10-90.

"*Standard White Layer Cake*"—the procedure of Yamazaki, W. T. was used. Yamazaki, W. T., 1970 AACC Technical Committee report: white layer cake test, Cereal Science Today 15:262.

All silicones were trimethylsiloxyendblocked polydimethylsiloxanes.

The variables studied included:

(A.) The replacement of 50% of the fat required in the cake recipe using silicone oils of (i) Example 4

(ii) Example 6

(iii) $(CH_3)_3SiO[(CH_3)_2SiO]_{223}Si(CH_3)_3$ (iv) An aqueous emulsion containing 35% by weight of a polydimethylsiloxane having about 350 cs viscosity.

(v) An aqueous emulsion containing 60% by weight of a polydimethylsiloxane having about 350 cs viscosity.

(B.) The straight substitution of 100% of the fat required in the cake recipe using silicone oils of (i) Example 8(A)(iii)

(ii) An aqueous emulsion containing 60% by weight of a polydimethylsiloxane having about 350 cs viscosity.

(C.) The substitution of 50% of the fat required in the cake recipe using the silicone oil of Example 8(A)(iii) and added commercial emulsifiers (i) Myvatex (2%)

(ii) Stearolac (0.5%).

(D.) The substitution of 100% of the fat required in the cake recipe using the silicone oil of Example 8(A)(iii) and added commercial emulsifiers (i) Myvatex (2%)

(ii) Stearolac S (0.5%)

(iii) Vanall (2%).

(E.) The substitution of 100% of the fat required in the cake recipe using the silicone oil of Example 8(a)(iii) wherein there is a variation in the mixing method.

(F.) The reduction of all the fat required in the recipe to 80% and the substitution of the remaining 20% with the silicone oil of Example 8(A)(iii).

(G.) The reduction of all of the fat required in the recipe to 90% and the substitution of the remaining 10% with the silicone oil of Example 8(A)(iii) plus the use of Solkafloc (5%).

(H.) Complete substitution of the fat required in the recipe with 1000 centistoke trimethylsiloxy and blocked-polydimethylsiloxane and added starch (i) Baka-Snak of modified starch (5%)

(ii) Keojel 30—instant (5%).

(I.) Complete substitution of the following silicone oils for fat and added emulsifiers Tween½ 60 (0.52% based on the weight of silicone fluid) and Span½ 20 (0.52% based on the weight of silicone fluid):

(i) Silicone oil of Example 4

(ii) Silicone oil of Example 6

(iii) Silicone oil of Example 8(A)(iii).

(J.) complete substitution of silicone oil of Example 8(A)(iii) under the following conditions:

(i) decreased required quantity by 20%

(ii) Baka-Snak modified starch (10%)

(iii) Tween 80 (10%)

(iv) Span 20 (10%).

(K.) Complete substitution of silicone oil as in (J.) under the following conditions:

(i) decreased quantity by 20%

(ii) xanthan gum to 0.6%

(iii) Tween 80 to 5%

(iv) Span 20 to 5%.

(L.)

(i) decreased required quantity by 20%

(ii) xanthan gum to 0.9%

(iii) Tween 80 to 70%

(iv) Span 20 to 7%.

In all cases, cakes were achieved indicating that silicone fluids can be substituted for normal fats used in baking cakes. No attempt was made to optimize the formulas shown above.

Generally, these experimental cakes had some loss of aeration and higher specific gravities with some loss in volume. Crust color was unaffected but crumbs were darker. Tenderness was relatively unaffected.

When the mixing method was modified wherein the egg white was prefoamed before addition, the specific gravity and volume were enhanced with some coarse cells.

Decreasing the original fat by 20% and complete substitution of the remaining oil produced cakes with improved texture.

EXAMPLE 9

Chiffon Cake

Chiffon cake was prepared using a formulation from Joy of Cooking, 1975 using the complete substitution of silicone oil of example 6 for vegetable oil, in addition to the control.

CHIFFON OIL CAKE

Use a 10-Inch Tube or a
9 × 13 Inch Oblong Pan

Have all ingredients about 70° F. Preheat oven to 325° F.
Sift twice and put into a beater bowl:
2¼ cups sifted cake flour
1½ cups sugar
3 teaspoons double-acting baking powder
1 teaspoon salt
Beat until smooth and fold in all at once:
½ cup vegetable oil
5 egg yolks
¾ cup water
1 teaspoon grated lemon rind
1 teaspoon vanilla
Beat until foamy:
6 to 10 egg whites
Add:
½ teaspoon cream of tartar
Now beat until the whites are so stiff that they begin to lose their gloss. Fold the flour, egg and oil mixture gently into the egg whites. Do this by hand, not in the mixer. Bake the cake in an ungreased tub pan about 1 hour and 10 minutes or in an ungreased 9×13-inch pan 30 to 35 minutes. Reverse the tube pan to cool the cake, or set the oblong pan reversed and supported at the edges by two other pans while the cake cools. Ice with:

QUICK LEMON ICING

A very subtle flavor may be obtained by coarsely grating the rind of an orange or lemon, wrapping the rind in a piece of cheesecloth, and wringing the citrus oils onto the sugar before it is blended. Stir the oil into the sugar and allow it to stand 15 minutes or more.

Blend well:
2 cups confectioners' sugar
¼ cup soft butter
Beat in:
1 or more tablespoons cream
If you have not treated the sugar as suggested above, add:
Grated rind and juice of 1 lemon or 3 tablespoons liqueur such as apricot or creme de cacao.

Depression of volume and coarse cell structure was noted in the silicone containing cake. Color was similar to the control. Tenderness was slightly less in the substituted cake, although quite acceptable.

EXAMPLE 10

Pie System

Pie pastry was prepared following the American Association of Cereal Chemists Method 10-60 and the "Experimental Study of Food".

BAKING QUALITY OF PIE FLOUR

Definition

This method describes two procedures for evaluating pie crust flour:

1) baking empty pie crusts and 2) baking a filled pie.

Scope

Applicable to flour used for pie crusts.

Apparatus

1. Electric mixer.
2. Rolling board with cloth cover.
3. Gauging sticks, two flat, 0.32 cm (⅛ in.) thick.
4. Rolling pin with cloth cover.

5. pie tins, 23 cm (9 in.) diam.

| Ingredients | Procedure Formula and notes | | |
|---|---|---|---|
| | Weight (g) | Percentage, Based on Flour (%) | Percentage, Composition (%) |
| Flour(14% mb) (see Table 82-23) | 1000 | 100 | 61.2 |
| Shortening, hydrogenated | 600 | 60 | 36.7 |
| Salt | 35 | 3.5 | 2.1 |
| Water, variable | — | 40 to 64 | — |
| Totals (without water) | 1635 | | 100.0 |

1. Add sufficient water to give 1000 g flour on 14% mb plus enough to produce medium soft, pliable dough. Report latter increment as flour absorption (14% mb). Good pie flours usually have ca 40% absorption.

2. Use any all-hydrogenated, pure vegetable plastic shortening, without added emulsifying agent, and free from undesirable color, odor, or flavor.

3. Use fine-granulated table salt.

4. Have all ingredients at 10° C. (50° F.) before mixing.

Method

1. Sift flour twice, place in mixing bowl, add shortening, and break up large lumps with flat beater by hand. Cut in shortening for 5 min on low speed. Disolve salt in portion of water and add this solution to flour-shortening mixture, together with additional water necessary. Mix 2 min at low speed. Store dough for 24 hr in refrigerator at 10° C. (50° F.) and test by empty shell or filled pie procedure.

2. Empty shells: Scale two 300-g (10.5-oz.) doughs, press each into a ball, and using gauge sticks, roll to 0.32-cm (⅛ in) thickness on lightly floured canvas. Fold twice to make four layers and fold edges to make square ca 12.5 cm (5 in.) on a side. Roll to 0.32-cm thickness. Again fold twice and form into square, and roll third time to 0.32 cm. Lay dough sheet over bottom of inverted pie tin, press down firmly, and trim off around edge. Make 40 to 50 small holes by pricking dough with fork and again press firmly at edges. Let dry for 30 min. cover with another pan press down firmly, and bake 20–25 min at 218° C. (425° F.). Remove second pie tin after 10 min in oven so that crust may brown. Examine shells 24 hr after baking.

3. Filled pie: Scale 300 g dough and roll bottom crust as described for empty shells. Place in pan, press down well, and trim. Fill to ca 0.63 cm (¼ in.) from top with one of fillings described below. For top crust, scale 300 g dough and roll once to 0.32-cm thickness. Cut center lightly to permit escape of steam, wet edge of bottom crust, cover with top crust, press down, and trim edges. Bake ca 30 min at 218° C. (425° F.).

4. Artificial fruit acid filling:

| | |
|---|---|
| Water, 20° C. (68° F.) | 950 ml |
| Corn starch | 230 g |
| Sugar, granulated | 1350 g |
| Citric acid (crystals) | 15 g |

Mix corn starch to smooth paste with 350 ml water. Dissolve 675 g sugar and 15 g citric acid in remainder of water (600 ml) and heat to boiling. Remove from heat and immediately stir in starch suspension; continue stirring until maximum viscosity is reached. Add balance of sugar (675 g) and stir until mass is smooth. Cool, with constant stirring, to 21° C. (70° F.) in water bath.

5. True fruit filling;

| | |
|---|---|
| Cling peaches | 1-qt can |
| Sugar | 60 g |
| Corn starch | 15 g |
| Water | 60 ml |

Mix corn starch to smooth paste with water at room temp. Drain syrup from peaches, add sugar to syrup, and bring to boil. Remove from heat and add corn starch suspension. Stir thoroughly, add to peaches (cut in small pieces), and cool to 21° C. (70° F.).

Interpretation of Baking Results

1. Judge pie flour quality by considering viscosity test results and performance in pie-baking test. When possible, compare with results obtained on known samples.

2. Examine empty shells after 24 hr, filled pies after 12 or 16 hr. Determine whether pie crusts: 1) are baked through, soft, or doughy; 2) have shrunk none, little, or much from edge of pan; 3) have blistered; 4) have light, slight brown, or golden brown color; 5) are flaky, compact, granular, or mealy; 6) are tender or tough; 7) are crisp or soft; and 8) have been penetrated, and to what extent, by fruit filling.

The following series of variables in addition to the control were used:

A. Complete replacement of fat by 100% of its weight of:
(i) Silicone oil of Example 4
(ii) Silicone oil of Example 6
(iii) Silicone oil of Example 8(A)(iii)

B. Complete replacement of fat by 80% of its weight of:
(i) Silicone oil of Example 4
(ii) Silicone oil of Example 8(A)(iii)

All of the silicone substitutions resulted in pastries comparable to the control in flakiness and appearance. Tenderness decreased in the pastry containing B.(i), while the B.(ii) variable was comparable to the control. AACC Method 10-60 was modified to reduce water required, dough holding time and baking time to improve the final product.

Cherry pie was attempted using pie pastry with the silicone oil of Example 6 at 100% substitution. The pastry functioned well and seepage of liquid from the fruit filling into the crust was minimal.

EXAMPLE 11

Chocolate Chip Cookies

Chocolate chip cookies following the Nestle cookie formulation were prepared using the complete substitution of silicone oil of example 8(A)(iii) for margarine used in the control. No adjustment was made for the fat/water ratio of margarines.

| Chocolate Chip Cookie Formulation, Nestle Co. | |
|---|---|
| Ingredient | Weight (g) |
| Flour (all purpose) | 156.25 |
| Butter (margarine) | 113.50 |
| Baking soda | 2.05 |
| Salt | 2.80 |
| Sugar, white granulated | 75.00 |
| Brown sugar | 84.00 |
| Vanilla, imitation | 2.50 |
| Egg | 50.00 |
| Chocolate chips | 164.00 |

Mixing Procedure

Sift dry ingredients together. Combine sugars, softened margarine and vanilla and beat until fluffy creamy. Add egg at medium speed until blended. Add flour mixture gradually at low speed, then increase speed to medium and beat until well blended. Add chocolate chips and mix into batter. Drop by tablespoon onto ungreased sheets and bake 9 minutes at 375° F. in a rotary oven. Cool and remove from sheet. Makes 21 cookies.

Substitution was successful in chocolate chip cookies. Moisture loss during baking was 6.7% for both types of cookies. Appearance was similar in both cookies, though the cookie containing silicone had a shiny surface and the chocolate chips appeared to be more prominent. The appearance was desirably enhanced. The silicone containing cookie was less tender than the control by objective measurement (36.3 lb/g versus 16.4 lb/g), though sensory analysis did not note such a great difference. Taste was comparable.

EXAMPLE 12

Oatmeal Cookies

Oatmeal cookies following the Quaker Oats formulation were prepared with complete substitution of the silicone oil of Example 8(A)(iii) for the vegetable shortening used in the control.

| Oatmeal Cookie Formulation, Quaker Oats Co. | |
|---|---|
| Ingredient | Weight (g) |
| Flour (all purpose) | 138.89 |
| Brown sugar | 224.00 |
| Sugar, white granulated | 100.00 |
| Egg | 50.00 |
| Water | 70.00 |
| Vanilla, imitation | 5.00 |
| Oats, uncooked old fashioned | 240.00 |
| Salt | 5.60 |
| Baking soda | 2.05 |
| Vegetable shortening | 157.07 |

Baking conditions are set forth in the examples.

Appearance of both cookies were similar and characteristic of an oatmeal cookie. The silicone containing cookie was less tender (48.9 lb/g) as compared to the control (36.7 lb/g) by both objective and subjective measurement, though it was not unacceptable. The substituted cookie was more chewy. The color of the cookies was similar. Baking losses were 10.2% for the cookie containing silicone oil and 11.2% for the control.

A second series of oatmeal cookies were prepared using complete substitution with the silicone fluid of example 6. This batter containing silicone oil was less viscous and darker but the baked cookies were similar in sheen, spread and baking losses. Although the cookie containing silicone fluid was again slightly less tender, it was evident that highly acceptable drop cookies can indeed be prepared with silicone oils.

EXAMPLE 13

Muffin System

Blueberry muffins following the Jordan Marsh Department Store formulation were prepared using the complete substitution of the silicone fluid of example 8(A)(iii) for margarine without adjustment for fat/water proportion in margarine.

| Blueberry Muffin Formulation. | |
|---|---|
| Ingredient | Weight (g) |
| Margarine | 113.50 |
| Sugar | 200.00 |
| Egg | 100.00 |
| Flour (all purpose) | 277.78 |
| Baking Powder | 8.20 |
| Salt | 2.80 |
| Milk, whole | 2.50 |
| Vanilla, imitation | 122.05 |
| Blueberries | 417.75 |

Mixing Procedure

Mix dry ingredients together. Cream margarine and sugar together. Add egg and vanilla at medium speed and blend well. Add your mixture alternately with milk at low speed. Increase to medium speed and beat until blended well. Crush ¼ cup blueberries and mix into batter. Fold in remaining blueberries. Line muffin tins with muffin cups (½ cup tins) and bake at 375° F. for 30 minutes. Allow to cool before removal from pan. Makes 12 muffins.

Substitution was highly successful in the muffins. The blueberries were very prominent making the substitute muffins attractive. No objective measurements were conducted. Informal visual and sensory observations noted muffins with volume, color and cell structure characteristics similar to those of the control. Baking moisture loss was less (12.9%) for the muffin containing silicone oil than for the control muffins (19.6%). A substitution for fat with the silicone oil of example 4 with no adjustment for water was attempted and also proved very successful.

Muffins were also prepared using the silicone oil of example 6 and adjusting for the fat/water preparation in the margarine at both the 50 and 100% level of substitution. Both products were highly acceptable, had good volume and blueberries again rose to the surface but were not as prominent as in the first series with excess silicone oil.

EXAMPLE 14

Nutrient Calculations

The recipe calculation routine of the Michigan State University Nutrient Data Bank was used to determine the calories and amount (in grams) of silicone/fat per serving of a variety of products. The weight of silicone was substituted with water to keep the total formula weight constant. These calculations which are presented in Table I show that there was a reduction in calories of one-quarter to over one-half with 100% substitution of silicone oil for fat in these products.

The results on Table III were obtained by the following Analytical Methods.

Sampling Procedures

Muffins: The muffins were quartered (vertically) and two opposing quarters were used in each analysis (approximately 50 g).

Cookies: Three cookies were stacked up and quartered. Two opposing quarters of each cookie were used in each analysis (approximately 39 g).

Ice Cream: A notch was taken from the brick of ice cream by making two cuts approximately ¾" apart and approximately 1" in from the brick end. The cuts extended beyond the center of the brick and resulted in a sample of approximately 50 g. A second notch was taken in the same brick but 1" from the other end and with the brick inverted. These two

TABLE I

Comparison of calories in products prepared with fat or with 100% of the fat substituted with silicone oil

| Product | Description of Serving | Calories/serving [a]Control Product | gm of Silicone per serving | Calories/serving Using Silicone | Percentage Reduction in Calories Using Silicone |
|---|---|---|---|---|---|
| Pie Crust of Example 10 | ⅛ of 9" pie crust | 61.5 | 4.1 | 25.0 | 59.3 |
| Chocolate Chip Cookies of Example 12 | 15.8 g (1 ¾" dia.) (42 per recipe) | 71.3 | 2.8 | 51.4 | 27.8 |
| Oatmeal Cookies of Example 12 | 12.8 g (1 ½" dia.) (85 cookies per recipe) | 51.8 | 1.8 | 35.5 | 31.4 |
| Blueberry Muffin of Example 13 | 110.0 g (1 muffin) | 270.6 | 10.0 | 198.7 | 26.6 |
| Chiffon Cake of Example 9 | 34.8 g 242" slice (30 pieces per cake) | 111.4 | 3.6 | 79.7 | 28.5 |

[a]prepared with fat.

EXAMPLE 15

The Michigan State University Nutrient Data Bank was also used to calculate selected nutrient contents of blueberry muffins and chocolate chip cookies. These data are summarized in Table II. Slight changes in carbohydrate and protein content resulted since the fat source in these products was margarine. The major change in nutrient composition, however, was the reduction in fat and calories as silicone oils were substituted for margarine.

TABLE II

Nutrient content of foods Using Silicone Oils

| | Batter Weight/gm | Approx. Baked Weight/gm | Calorie Constant Kilocalorie | Carbo-hydrates (gm) | Protein (gm) | Fat (gm) | Crude Fiber (gm) | Diet Fiber (gm) |
|---|---|---|---|---|---|---|---|---|
| Muffin with 10 g Margarine Example 13 | 110 | 99 | 271 | 42.2 | 4.3 | 9.8 | .55 | 1.8 |
| Muffin with 100% (8 g) Silicone Substitute for Fat Example 13 | 110 | 99 | 199 | 42.1 | 4.2 | 1.7 | .55 | 1.8 |
| Muffin with 50% (4 g) Silicone Substitute for Fat Example 13 | 110 | 99 | 235 | 42.2 | 4.3 | 5.7 | 155 | 1.8 |
| Chocolate Chip Cookies Example 11 | 28.3 | 25.7 | 127.4 | 16.5 | 1.55 | 6.25 | 0.35 | .2 |
| Chocolate Chip Cookies with 100% (2.8 g) Silicone Substitute for Oil Example 11 | 28.3 | 25.7 | 91.4 | 16.4 | 1.51 | 2.21 | 0.35 | .2 |

Samples were combined for one analysis of the brick.

Analytical Method

The sample was weighed and blended with 500 ml of methylisobutylketone (MIBK) solvent. This blend was allowed to stand overnight. Two hundred ml of water was added and the mixture was stirred vigorously for approximately 1 hour. Then 10 ml concentrated HCl was added and again the mixture was stirred for ½–1 hour. Approximately 30 ml of the MIBK phase was withdrawn from the mixture and centrifuged. A five ml aliquot of the clear supernatant solvent extract was diluted to 250 ml in fresh MIBK and this solution was analyzed for Si content by atomic absorption spectroscopy. No silicon was detected in the control samples using this method (i.e. less than 20 ppm).

recipe.

Preliminary work indicated that 100 percent substitution of milkfat with the silicone oil yielded an ice cream type product very close in quality to a product prepared with only a 50 percent rate of substitution Therefore, the 100 percent substitution of milkfat was used for subsequent studies. Characteristics of substituted products causing problems in preliminary studies included: 1) a depression of overrun (air entrainment), 2) difficulty with the emulsification of the silicone fluids into the mix, 3) a coating of the mouth and lips during sensory evaluation, 4) shrinkage of the product in the container, 5) icy texture formation during storage, and 6) crumbly body defects in the final product. Another characteristic identified was the apparent enhancement of flavors, especially sweetness, found in substituted products.

TABLE III

ANALYSIS OF FOOD FOR SILICONE

| FOOD | SAMPLE DESCRIPTION | ACTUAL ANALYSIS | | | FOOD FORMULATION GOALS | | |
|---|---|---|---|---|---|---|---|
| | | WT. OF ITEM (gm) | % PDMS* | WT. PDMS* PER ITEM (gm) | ITEM WT. (gm) | % PDMS* | WEIGHT PDMS* PER ITEM (gm) |
| Cookies Example 11 | Placebo | | None Detected | <00.5 mg | 25.7 | — | — |
| | Placebo | | None Detected | " | | | |
| | 100% Dose | 26.1** | 13.1 | .43 | 25.7 | 14.3 | 3.67 |
| | 100% Dose | 26.9** | 12.9 | 3.45 | | | |
| | 100% Dose | 25.8** | 15.4 | 3.95 | | | |
| | 100% Dose | 26.8** | 12.6 | 3.38 | | | |
| | Average | 26.4 | 13.5 | 3.55 | | | |
| Muffins Example 13 | Placebo | | | | 100 | — | — |
| | 50% Dose | 93.7 | 5.26 | 4.93 | 100 | 4.0 | 4.0 |
| | 50% Dose | 89.4 | 4.72 | 4.22 | | | |
| | 50% Dose | 97.5 | 4.37 | 4.26 | | | |
| | Average | 93.5 | 4.78 | 4.47 | | | |
| | 100% Dose | 95.1 | 7.25 | 6.90 | 100 | 8.0 | 8.0 |
| | 100% Dose | 94.3 | 7.62 | 7.18 | | | |
| | 100% Dose | 93.5 | 9.33 | 8.72 | | | |
| | Average | 94.3 | 8.07 | 7.60 | | | |

100% Dose (6 cookies + 1 muffin): maximum - 32.4 g; minimum - 27.2 g
*Polydimethylsiloxane
**Average of three cookies

EXAMPLE 16

Frozen desserts were prepared using the silicone oil of example 1 as a direct substitution for the milkfat in the The formulations for the control product and the substituted product were as follows:

| Ingredients[6] | Weight (gms) | Fat (gms) | MSNF[1] (gms) | Sugar (gms) | SE[2] (gms) | TS[3] (gms) |
|---|---|---|---|---|---|---|
| Cream (40% Fat; 5.4% MSNF) | 25.00 | 10.00 | 1.35 | — | — | 11.35 |
| NFDMS[4](96% MSNF) | 4.91 | — | 4.71 | — | — | 4.71 |
| Skim milk (9% MSNF) | 54.89 | — | 4.94 | — | — | 15.00 |
| Sugar (100% Solids) | 15.00 | — | — | 15.00 | — | 15.00 |
| S.E. (100% Solids)[5] | 0.25 | — | — | — | 0.25 | 0.25 |
| Total Weight | 100.00 | 10.00 | 11.00 | 15.00 | 0.25 | 36.25 |
| Percent | 100.00 | 10.00 | 11.00 | 15.00 | 0.25 | 36.25 |

[1]Milk-solids-non-fat (approximately 55% Lactose, 37% Protein and 8% Ash)
[2]Stabilizer-Emulisfier Solids
[3]Total Solids
[4]Non-fat, dry milk solids

| Ingredients[6] | Weight (gms) | Fat (gms) | MSNF[1] (gms) | Sugar (gms) | SE[2] (gms) | TS[3] (gms) |
|---|---|---|---|---|---|---|

[5]Stabilizer-Emulisifier Preparation (Kontrol, Germantown Mfg. Co., 505 Parkway, Broomall, PA, 19800. Ingredients: Mono and diglycerides, cellulose gum, guar gum, Polysorbate 80, and carrageean. Sodium siliconate-aluminate added for anti-caking properties.)
[6]For 100% substitution formula see Table IV The frozen dessert prepared with silicone fluid substituted for 100 percent of the milkfat showed definite improvements in characteristics however the overall character of the product approximates that of a good ice milk rather than a good ice cream.

The most dramatic factor of the substituted product has been the reduction in caloric content in comparison to the control. Table V shows that although slightly denser per serving, the reduction in caloric value is 51 percent. The calorie content of this product is approximately equal to that of fruit-flavored yogurt and the substituted product has a much greater dessert or snack appeal.

EXAMPLE 17

Preliminary work in the manufacture of cheese curd from filled milk prepared using 100 percent substitution of milkfat with silicone oil indicated that a curd with proper body and texture was feasible.

Dagano cheese was selected as the experimental cheese type due to its relatively rapid ripening period of 27–35 days and the potential for visual evidence of starter bacteria activity. The visual evidence of starter activity is found in the formation of gas holes in this Swiss-type cheese. The procedure for the manufacture of Dagano cheese may be found in *Practical Cheesemaking*. IIthed. G. H. Wilster. OSU Book Stores, Inc., Corvallis. The gross composition of the milk and filled milk used for Dagano cheese preparation

TABLE IV

100% Substitution Formulae
100% Substitution Formulation

| Ingredients | Weight(g) | Substitute(g) | MSNF(g)[1] | Sugar(g) | CS(g)[2] | SEg[3] | TS(g)[4] |
|---|---|---|---|---|---|---|---|
| Silicone Fluid (350 cs) | 10.00 | 10.00 | — | — | — | — | — |
| NFDMS | 11.46 | — | 11.00 | — | — | — | 11.00 |
| Water | 66.29 | — | — | — | — | — | — |
| Sugar | 9.60 | — | — | 9.60 | — | — | — |
| Corn Syrup Solids (42DE; 96% Solids) | 2.40 | — | — | — | 2.40 | — | 2.40 |
| Carrageenan LMR[5] | .15 | — | — | — | — | .15 | .15 |
| Tween 80[6] | .05 | — | — | — | — | .05 | .05 |
| Span 20[7] | .05 | — | — | — | — | .05 | .05 |
| Total Weight | 100.00 | 10.00 | 11.00 | 9.60 | 2.40 | .25 | 33.25 |
| Percent | 100.00 | 10.00 | 11.00 | 9.60 | 2.40 | .25 | 33.25 |

[1]Milk-solids-not-fat (approximately 55% Lactose, 37% Protein and 8% Ash)
[2]Corn Sweetener
[3]Stabilizer-Emulsifier Solids
[4]Total Solids
[5]Stabilizer from FMC, Marine Colloids Div., Box 308 Rockland, ME, 04841
[6]Polysorbate 80
[7]Sorbitan 20

TABLE V

Comparison of Calories in Ice Cream Prepared With Milkfat or With 100% of the Milk Fat Substituted With Silicon Oil (350 Centistokes)

| Product | Serving (gm) | Carbohydrate (gm) | Protein (gm) | Fat (gm) | Silicone Fluid (gm) | Calories Per Serving[1] | Percent Reduction in Calories |
|---|---|---|---|---|---|---|---|
| Vanilla Ice Cream 1 cup (80% overrun[2]) | | | | | | | |
| Control | 144 | 30.3 | 5.9 | 14.4 | — | 269.1 | — |
| Substituted | 143 | 25.0 | 5.8 | — | 14.3 | 121.8 | 54.7 |

[1]Calories per serving = (g carbohydrate × 3.87 calories/g) + (g protein × 4.27 calories/g) + (g fat × 8.79 calories/g)

[2]Percent overrun = $\frac{\text{wt. per unit volume of mix} - \text{wt. per unit volume of ice cream}}{\text{wt. per unit volume of ice cream}} \times 100\%$ is shown in Table V. All milks were pasteurized at 145° F. for 30 minutes and the filled milk was homogenized at 3000 psi. The calculated composition of Dagano cheese is shown in Table VI.

The Dagano cheese prepared with the silicone fluid filled milk attained very acceptable body and texture characteristics after 5 weeks of aging. Gas holes were of normal proportions for Dagano cheese. The gas holes tended to arrange themselves in two rows rather than being randomly spaced in the cheese. This alignment likely resulted from the method of packing curds in the hoop and could easily be remedied. The filled milk cheese had excellent slicing qualities and showed no visible free silicone fluid on the cut surface.

TABLE V (Gross Composition of Milk and Filled Milk Used for the Preparation of Dagano Cheese.

| Product | Milkfat % | Silicone Oil (350 centistokes) % | Milk-solids-not-fat % |
|---|---|---|---|
| Milk (Control) | 3.1 | — | 8.8 |
| Filled Milk[1] | 0.8 | 2.3 | 8.8 |

[1]Filled milk also contained 0.05% Tween 80 and 0.05% Span 20 as emulsifiers.

TABLE VI

Calculated Gross Composition of Dagano Cheese Prepared With Milk and Filled Milk Assuming a 46 Percent fat:dry Matter Ratio and a 43 Percent Moisture Content.

| Product | Fat % | Silicone % | Protein % | Lactose % | NaCl % | Ash % |
|---|---|---|---|---|---|---|
| Control Cheese | 26.0 | — | 25.5 | 1.5 | 1.5 | 2.5 |
| Filled Milk Cheese | 7.0 | 19.0 | 25.5 | 1.5 | 1.5 | 2.5 |

EXAMPLE 18

Several materials falling within the scope of the formula of claim 1 were investigated for their usefulness in a cookie recipe.

The cookies were prepared from the following recipe. It should be noted that the formulations were not optimized and that this example was a screening test for cookie preparation.

TOLL HOUSE CHOCOLATE CHIP COOKIE -- NESTLE COMPANY

| INGREDIENT | WEIGHT (g) |
|---|---|
| Flour, all-purpose | 78.13 |
| Silicone Substance | 45.40 |
| Water | 11.35 |
| Baking Soda | 2.05 |
| Salt | 1.40 |
| Granulated Sugar | 37.50 |
| Brown Sugar | 42.00 |
| Vanilla | 1.25 |
| Egg | 25.00 |
| Chocolate Chips | 82.00 |

NOTE:

TOLL HOUSE CHOCOLATE CHIP COOKIE -- NESTLE COMPANY -continued

| INGREDIENT | WEIGHT (g) |
|---|---|

Silicone substance and water weights based on the weight of margarine for which recipe called (80% fat)

PROCEDURE

1. Sift together flour, salt, and baking soda.
2. using a KitchenAid® mixer, model K5-A, equipped with a stainless steel bowl and a paddle attachment, the silicone substance, water, granulated sugar, brown sugar and vanilla were beaten for one minute at speed 6. The bowl and paddle were scraped. Beating was continued for an additional minute after which the bowl and paddle were scraped again.
3. The egg was added and mixing continued at speed 4 for 45 seconds. The bowl and paddle was again scraped.
4. The dry ingredients were added over 30 seconds with the mixer operating at speed 1.
5. The chocolate chips were added and the mixture beaten for 15 seconds using speed 1.
6. The cookies were shaped into balls of approximated 25 grams and placed on parchment paper squares. This yielded 10 cookies per batch.
7. The cookies were baked on aluminum baking sheets in an Etco forced convection oven set at 375° F. for 9 minutes. The cookies were cooled on wire racks for 10 minutes before the parchment paper was removed. After cooling an additional 20 minutes, the cookies were placed in polyethylene Ziploc® storage bags, overwrapped with foil and stored at 0° F.

SAMPLE a

The silicone material used in this sample was $[CH_3(C_6H_5)_2Si]_2O[Si(CH_3)_2O]_2$ Chocolate chip cookies were prepared for this and all other samples following the formula and procedure described above unless otherwise noted. A cookie was prepared using this material. The surface was opaque with a whitish appearance occurring from ¼ inch from the perimeter across the top. The outer ¼ inch had the normal dark brown shiny surface characteristic of cookies prepared with silicone. Surface cracking was also apparent; cookie appeared doughy between cracks. The bottom surface was very glossy. The interior was soft and moist with numerous larger air cells. NOTE: An off-odor was apparent during mixing, baking and removal of the cookies from the oven but diminished when the cookies cooled.

YIELD: Ten 25 gram cookies and 1 small cookie.

SAMPLE b

The silicone material used in this sample was $[(CH_3)_3Si]_2O[CH_3(C_6H_5)SiO]_6[(CH_3)_2SiO]_6$ Cookies could be prepared using this material. The cookies were a uniform brown color, shiny and slightly waxy-looking on the surface. Some indentations occurred on the surface but full cracking did not occur. The cookies maintained their height on removal from the oven. The interior of the cookie was lightly firm and moist. They had large air cells with thick cell walls.

YIELD: Ten 25 gram cookies and 1 small cookie.

SAMPLE c

The silicone material used in this sample was

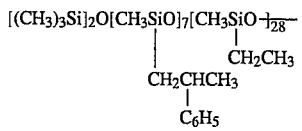

Cookies could be prepared using this material. The cookies were slightly puffy and peaked when removed from the oven but flattened upon cooling. The surface of the cookie had a speckled appearance with translucent, whitish areas among the characteristic brown shiny surface. Several indentations were evident but the surface was intact. The interior of the cookie was soft with vary large air cells, thick cell walls and an even brown color.

YIELD: Eleven cookies of approximately 25 grams.

SAMPLE d

The silicone material used in this sample was

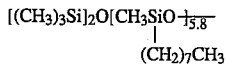

Cookies could be prepared using this material. The cookies had good spread and a flat even surface. The surface was golden-Brown, shiny and had several air cells that had broken through the surface. The bottom of the cookie was very oily and the oil had soaked through the parchment paper on which the cookies were baked. The interior of the cookies also was oily in appearance, had large air cells with thick cell walls and appeared lighter in color toward the center of the cookie.

YIELD: Was Eleven cookies of approximately 25 grams each.

SAMPLE e

The silicone material used in this sample was

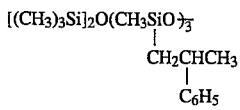

Cookies could be prepared using this material. Cookies had a glossy, speckled, deep golden brown surface. Cookie spread was acceptable but the surface was cracked. The interior of the cookie was shiny, very moist in appearance, golden brown with large air cells and thick cell walls. The yield was about eleven cookies of approximately 25 grams each.

SAMPLE f

The silicone material used in this sample was

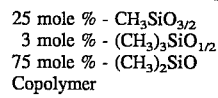

| 25 mole % - $CH_3SiO_{3/2}$ |
| 3 mole % - $(CH_3)_3SiO_{1/2}$ |
| 75 mole % - $(CH_3)_2SiO$ |
| Copolymer |

Cookies could be prepared using this substance. The cookies were tan to a light brown in color and had cracks in the surface of the cookies. A translucent, waxy-like appearance was evident in the cracked areas. Cookies had acceptable spread. The interior of the cookie was moist in appearance, light tan, and had large cells with thick cell walls. The yield was about eleven cookies of approximately 25 grams each.

SAMPLE g

The silicone material used in this sample was

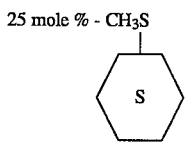

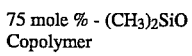

Cookies could be prepared using this substance. Cookies had excellent spread, were deep golden brown with a semi-glossy surface but surface cracking occurred. Numerous air cells were detectable within the cracks. The cookies had a moist interior appearance, large air cells and thick cell walls.

The yield was about eleven cookies of approximately 25 grams each.

SAMPLE h

The silicone material used in this sample was

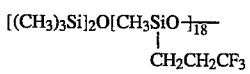

Cookies could be prepared using this material. Cookies were puffy at the end of baking and retained this rounded appearance on cooling and thus reduced cookie spread resulted. Cookies were semi-glossy golden brown with numerous surface cracks. These cracks had large air cells and the bottom surface also had very large air cells. These cookies stuck to the parchment paper making the cookies difficult to remove. The interior was very moist and appeared to be quite chewy. The cookies had large air cells with thick cell walls and an even color throughout.

The yield was about eleven cookies of approximately 25 grams each.

SAMPLE i

The silicone material used in this sample was

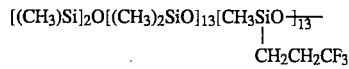

Cookies could be prepared using this material. Cookies were puffy at the end of baking and retained this rounded appearance on cooling and thus had reduced cookie spread. Cookies were a light golden brown in color and had a semi-glossy spotted top surface with noticeable indentations. The bottom surface had large air cells and stuck to the parchment paper making the cookies difficult to remove. The interior was very moist and appeared to be quite chewy. The cookies had large air cells with thick cell walls and and even color throughout.

The yield was about eleven cookies of approximately 25 grams each.

SAMPLE j

The silicone material used in this sample was

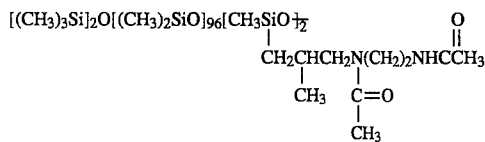

Cookies could be prepared using this material. This substance was a light golden, rather viscous fluid. The resulting cookie dough was very thick with a slight grayish tinge. Cookies retained the pre-baking drop-like appearance and thus did not spread. The color was a dull grayish-brown. Deep cracks formed during baking so the cookies had a wrinkle appearance. The cookies were very easy to remove from the parchment paper. The cookies had a firm surface and a soft, moist center making them appear to be slightly under-baked. These cookies had medium size air cells.

The yield was about eleven cookies of approximately 25 grams each.

SAMPLE k

The silicone material used in this sample was

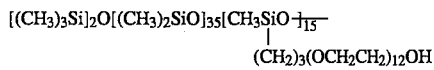

Cookies could be prepared with this material. Cookie batter was thick and tan in color. These cookies retained their pre-baking appearance but had slightly more spread than the cookies prepared in sample j. Numerous surface cracks appeared after removal from the oven. The surface was light tan with a grayish tinge. The surface texture appeared grainy and was dull. The interior was soft but appeared completely baked. These cookies had a good structure and was typical of a chocolate chip cookie.

The yield was about eleven cookies of approximately 25 grams each.

SAMPLE l

The silicone material used in this sample was

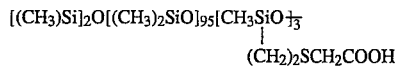

Cookies could be prepared using this material. Color of the cookies was light tan with light brown edges. The top surface was "pebbly" in appearance while the bottom surface was smooth with large air cells apparent. The cookies were easy to remove from the parchment paper and very little oily residue was found on the paper. The interior had fairly large air cells with thick cell walls. The cookies were crisp to break. These cookies were baked 10¼ minutes by mistake. The yield was about eleven cookies of approximately 25 grams each.

SAMPLE m

The silicone material used in this sample was

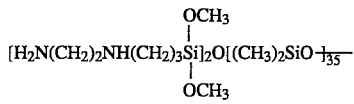

Cookies could be prepared using this material. The cookie dough was very thick resulting in the retention of the drop-like appearance during baking with no noticeable spread. The cookies looked very unappetizing being very light tan in color. The cookies were easy to remove from the parchment paper and little detectable oil remained on the surface of the paper. The cookie interior had medium sized air cells and acceptable texture. The interior also was soft and moist. The cookie bottom was smooth with interior also was soft and moist. The cookie bottom was smooth with some air cells apparent. The very viscous batter was difficult to remove from the bowl and utensils.

The yield was about eleven cookies of approximately 25 grams each.

SAMPLE n

The silicone material used in this sample was

| 1 mole % $(CH_3)_3SiO$ |
|---|
| 99 mole % $(CH_3)(CH_2=CH)SiO$ |

Cookies could be prepared using this material. The cookies had a fair amount of spread. These cookies were golden brown with darker brown edges. The cookies had several indentations across the surface. The interior had large air cells with thick cell walls and was a uniform golden brown color throughout. The interior was very moist although the cookie appeared fully baked. The bottom surface was shiny with large air cells.

The yield was about eleven cookies of approximately 25 grams each.

SAMPLE o

The silicone material used in this sample was

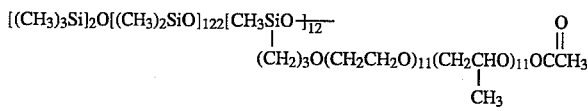

Cookies could be prepared using this material. The cookies were very light tan in color. The cookie surface was dull and smooth on the top but had numerous deep cracks. The bottom surface had shiny specks and evenly distributed fine air cells. The interior air cell distribution was typical of a high quality cookie. The interior was soft and moist but fully baked.

The yield was about ten cookies of approximately 25 grams each.

SAMPLE p

The silicone material used in this sample was $C_6H_5SiO_{3/2}$, high silanol-containing flake resin.

Cookies could be prepared using this material. Crystal nature of the powder necessitated reducing the mixer speed in mixing steps 2 and 3 to 4 as the dough ingredients would not stay in the bowl. It was difficult to cream this material with the sugar as the crystals broke into smaller pieces but did not become small enough to be undetectable as discrete particles until the egg was added. The batter was coarse dark brown in color. The cookies spread very little. They appeared very irregular with grainy, uneven areas and small sections of what appeared to be melted silicone. Clear areas were also apparent on the bottom of the cookie. The cookie bottom also had large air cells. The cookie interior had large air cells with thick cell walls. The interior was soft. The cookie surface had almost a meringue-like coating with clear shiny areas evident throughout.

The yield was about eleven cookies of approximately 25 grams each.

EXAMPLE 19

The silicone material used in this example was $(C_6H_5SiO_{3/2})_{12}$.

TOOL HOUSE CHOCOLATE CHIP COOKIE -- NESTLE COMPANY
(Adapted for reduced amount of silicone)

| INGREDIENT | WEIGHT |
| --- | --- |
| Flour, all-purpose | 39.06 |
| Silicone Substance | 22.70 |
| Water | 5.67 |
| Baking Soda | 1.03 |
| Salt | 0.70 |
| Granulated Sugar | 18.75 |
| Brown Sugar | 21.00 |
| Vanilla | 0.60 |
| Egg | 12.50 |
| Chocolate Chips | 41.00 |

NOTE:
Silicone substance and water weights based on the weight of margarine for which recipe called (80% fat).

PROCEDURE

1. Sift together flour, salt, and baking soda.

2. Using a General Electric® hand mixer, the silicone substance, water, granulated sugar, brown sugar and vanilla were beaten for 30 seconds using low. The bowl and beaters were scraped. Beating was continued for an additional 30 seconds after which the bowl and beaters were scraped again.

3. The egg was added and mixing continued on low speed for 25 seconds. The bowl and beaters were again scraped.

4. The dry ingredients were added over 15 seconds with the mixer operating at low speed. The bowl and beaters were scraped after which the mixture was beaten at low speed for 15 seconds and again scraped.

5. At this point the mixture was too dry to form into cookie balls so 5.67 ml of additional water was added and mixing continued for 15 seconds. An additional 5 ml of water was again added so that a cookie dough consistency was formed.

6. The chocolate chips were added and the mixture beaten for 15 seconds using speed 1.

7. The cookies were shaped into balls of approximated 25 grams and placed on parchment paper squares. This yielded 10 cookies per batch.

8. The cookies were baked on aluminum baking sheets in an Etco forced convection oven set at 375° F. for 9 minutes. The cookies were cooled on wire racks for 10 minutes before the parchment paper was removed. After cooling an additional 20 minutes, the cookies were placed in polyethylene Ziploc® storage bags, overwrapped with foil and stored at 0° F.

Cookies could be prepared using this material. These cookies were puffed and spread very little. The surface was very white in color with light brown areas scattered across the top. Very small air cells were noted on the top surface. These cookies stuck slightly to the parchment paper. The interior was very soft, almost cake-like and had medium sized air cells.

The yield was about six cookies of approximately 25 grams each.

Since many of the examples herein provide for the identification of viscosity of the silicone fluids, rather than molecular weight, the following Table VII is provided as a convenient means of determining molecular weight.

TABLE VII

MOLECULAR WEIGHT-VISCOSITY RELATIONSHIP OF DIMETHYL POLYSILOXANES

| Fluid | Viscosity at 77° F., cs | Average Molecular Weight |
| --- | --- | --- |
| Dimer | 0.65 | 162 |
| Trimer | 1.0 | 236 |
| Tetramer | 1.5 | 311 |
| Pentamer | 2.0 | 385 |
| Hexamer | 2.63 | 458 |
| Heptamer | 3.24 | 532 |
| Octamer | 3.88 | 606 |
| Nonamer | 4.58 | 680 |
| Polymer | 9.90 | 1,150 |

TABLE VII-continued

MOLECULAR WEIGHT-VISCOSITY RELATIONSHIP OF DIMETHYL POLYSILOXANES

| Fluid | Viscosity at 77° F., cs | Average Molecular Weight |
|---|---|---|
| | 48.0 | 3,800 |
| | 102.0 | 7,140 |
| | 290.0 | 14,100 |
| | 930.0 | 25,300 |
| | 1,722.0 | 40,700 |
| High Polymers | 3,060.0 | 50,800 |
| | 10,600 | 70,800 |
| | 23,360 | 69,900 |
| | 40,000 | 85,400 |
| | 746,000 | 148,000 |

That which is claimed is:

1. A food composition for human consumption comprising oil and non-oil components wherein the oil component comprises polyorganosiloxanes having an organic carbon content of at least fifteen weight percent, wherein the carbon is linked to silicon by silicon-carbon bonds; all molecular components of said polyorganosiloxanes having a molecular weight of at least 500 g/mole and having the general formula $$\{R_3SiO_{1/2}\}_a\{R_2SiO_{2/2}\}_b\{RSiO_{3/2}\}_c\{SiO_{4/2}\}_d —$$
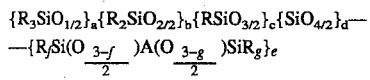

wherein each R is individually selected from the group consisting of (i) $CH_2=CH—$;

(ii)

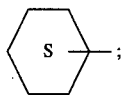

(iii) alpha phenylethyl;
(iv) beta phenylethyl;
(v) alkyl groups of 1 to 20 carbon atoms;
(vi) hydrogen;
(vii) hydroxyl;
(viii) $R'(CH_3)_2SiO—$;
(ix) $R'OOC(CH_2)_h—$ wherein each R' is individually selected from the group consisting of hydrogen and an alkyl radical of 1 to 20 carbon atoms, wherein h is an integer of from 2 to 10;

(x) $R"O(C_2H_4O)_n(C_3H_6O)_m(CH_2)_p$———;

wherein n and m each have an average value of from 1 to 25 and R is an integer of from 2 to 6, and R" has the same meaning as R, above;

(xi) $R"O(C_2H_4O)_n(CH_2)$———;

(xii) $R"O(C_3H_6O)_m(CH_2)$———;

wherein in each case n and m each have an average value of from 1 to 25 and p is an integer of from 2 to 6, and R" has the same meaning as R, above, and, (xiii) 2-phenylpropyl;

A is a hydrolyrically stable divalent hydrocarbon radical attached to two silicon atoms by silicon-carbon bonds; a, b, c, d, e, f, and g have mole fraction values respectively ranging from 0–1, 0–1, 0–1, 0–0.75, 0–1, 0–3, and 0–3.

2. A food composition as claimed in claim 1 wherein at least half of such carbon is in the form of methyl groups on silicon.

3. A food composition as claimed in 2 wherein the polyorganosiloxane has the general formula

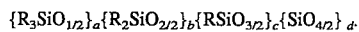

4. A food composition as claimed in claim 3 wherein the polyorganosiloxane is a copolymer and has the general formula

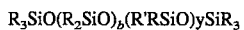

wherein each R is independently selected from a group consisting of $CH_3—$, $CH_3CH_2—$, $HO—$, and $R"OOCH_2CH_2—$, wherein R" is selected from a group consisting of $CH_3—$, $C_2H_5—$, and $HO—$; b has an average value of 25 to 500, y has an average value of 25 to 500 and the sum of b+y has an average value of 25 to 500.

5. A food composition as claimed in claim 2 wherein the polyorganosiloxane has the general formula

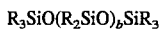

wherein each R is independently selected from a group consisting of $CH_3—$, $CH_3CH_2—$, $C_6H_5—$, $HO—$, $R'OOCCH_2CH_2—$, wherein R' is selected from a group consisting of $CH_3—$, $C_2H_5—$, $C_6H_5—$, and $HO—$, and b has an average value of from 25 to 500.

6. A food composition as claimed in claim 5 wherein the polyorganosiloxane has the formula

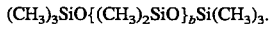

7. A food composition as claimed in claim 6 wherein b has an average value of 25.

8. A food composition as claimed in claim 6 wherein b has an average value of 100.

9. A food composition as claimed in claim 6 wherein b has an average value of 250.

10. A food composition as claimed in claim 6 wherein b has an average value of 500.

11. A food composition as claimed in claim 5 wherein the polyorganosiloxane has a monodisperse molecular weight distribution.

12. A food composition as claimed in claim 5 wherein the polyorganosiloxane is resinous.

13. A food composition as claimed in claim 12 wherein the resinous polyorganosiloxane has an average degree of organo substitution on silicon ranging from 1.0 to 2.0.

14. A food composition as claimed in claim 12 wherein the resinous polyorganosiloxane is a copolymer consisting of $SiO_2$ units, $(CH_3)_3SiO_{1/2}$ units, $CH_3SiO_{3/2}$ units, and $Q(CH_3)_2SiO_{1/2}$ units, wherein Q is a radical selected from a group consisting of hydrocarbon groups consisting of carboxyl, ester, amide, amino, mercapto, nitrile, nitro, carbonyl, alkyl groups containing from 3 to 20 carbon atoms and polyalkylene oxide polymers and copolymers containing, either singly or in combination, polyoxyethylene units, polyoxypropylene units, and polyoxybutylene units.

15. A food composition as claimed in claim 14 wherein the resinous polysiloxane is a copolymer wherein the ratio of $SiO_2$ units to the total $(CH_3)_3SiO—$ and $Q(CH_3)_2Si$ units is in the range of 1:0.6 to 1:1.2.

16. A food composition as claimed in claim 5 wherein the polyorganosiloxane has the formula

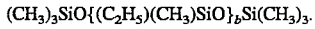

17. A food composition as claimed in claim 16 wherein b has an average value of 25.

18. A food composition as claimed in claim 16 wherein b has an average value of 250.

19. A food composition as claimed in claim 1 wherein the polyorganosiloxane has the general formula

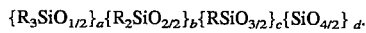

20. A food composition as claimed in claim 19 wherein the organopolysiloxane is selected from a group consisting of copolymers having the average structural formulae

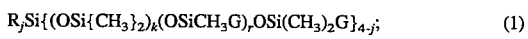 (1)

 (2)

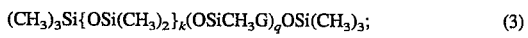 (3)

and

in which formulae each R is an aliphatic hydrocarbon radical free of aliphatic unsaturation and contains 1 to 10 carbon atoms; G is a radical of the structure —D(OR"), T wherein D is an alkylene radical; R" is composed of ethylene radicals and radicals selected from the group consisting of propylene and butylene radicals, the amount of ethylene radicals relative to the other alkylene radicals being such that the ratio of carbon atoms to oxygen atoms in the total OR" blocks ranges from 2.3:1 to 2.8:1; t has an average value from 25 to 100; T is a radical selected from the group consisting of the OR', —OOCR', and —OC=OOR' radicals wherein R' is a radical free of aliphatic unsaturation selected from the group consisting of hydrocarbon and hydrocarbonoxy radicals, the T radical containing a total of less than eleven atoms;

j has an average value of from 0 to 1;

k has an average value of from 6 to 420; r has an average value of from 0 to 30;

p has an average value of from 1 to 30;

q has an average value of from 3 to 30;

said copolymers containing at least 13 percent by weight $OSi(CH_3)_2$ units based on the weight of the copolymer.

21. A food composition as claimed in claim 20 wherein the organopolysiloxane has the average formula

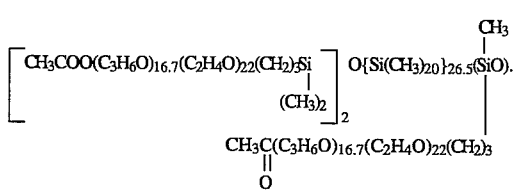

22. A food composition as claimed in claim 1 which is a bakery product.

23. A food composition as claimed in claim 22 wherein the bakery product is selected from a group consisting of (i) cake (ii) pie crust (iii) cookie (iv) bread (v) cereal (vi) doughnut (vii) cracker and, (viii) snack food.

24. A food composition as claimed in claim 23 wherein the snack food is potato chips.

25. A food composition as claimed in claim 29 wherein the snack food is popcorn.

26. A food composition as claimed in claim 23 wherein the snack food is cornchips.

27. A food composition as claimed in claim 1 wherein the food is in the form of a spread.

28. A food composition as claimed in claim 27 wherein the spread is margarine.

29. A food composition as claimed in claim 27 wherein the spread is salad dressing.

30. A food composition as claimed in claim 27 wherein the spread is peanut butter.

31. A food composition as claimed in claim 1 wherein at least 0.1 weight percent of the organic fats and oils in food are substituted with polyorganosiloxanes.

32. A food composition as claimed in claim 1 wherein the food is a confection.

33. A food composition as claimed in claim 32 wherein the confection is a chocolate drop.

34. A food composition as claimed in claim 32 wherein the confection is candy.

35. A food composition as claimed in claim 34 wherein the candy is fudge.

36. A food composition as claimed in claim 32 wherein the confection is icing.

37. A food composition as claimed in claim 1 which is a dairy product.

38. A food composition as claimed in claim 37 wherein the dairy product is selected from a group consisting of (i) cheese (ii) milk (iii) ice cream (iv) whipped cream and (v) yogurt.

39. A food composition as claimed in claim 38 wherein the cheese is soft curd cheese.

40. A method of preparing food for human consumption comprising oil and non-oil components comprising the steps of (I), preparing the non-oil components and (II) contacting the oil components with the non-oil components, wherein there is used in such preparation as the oil component, polyorganosiloxanes, said polyorganosiloxanes having an organic carbon content of at least fifteen weight percent, wherein the carbon is linked to silicon by silicon-carbon bonds; all molecular components of said polyorganosiloxanes having a molecular weight of at least 500 g/mole and having the general formula $\{R_3SiO_{1/2}\}_a\{R_2SiO_{2/2}\}_b\{RSiO_{3/2}\}_c\{SiO_{4/2}\}_d$—
—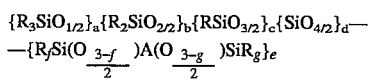

wherein each R is individually selected from the group consisting of (i) $CH_2=CH-$;

(ii)

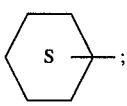

(iii) α—phenylethyl;
(iv) β—phenylethyl;
(v) alkyl groups of 1 to 20 carbon atoms;
(vi) hydrogen;
(vii) hydroxyl;
(viii) R'(CH$_3$)$_2$SiO—;
(ix) R'OOC(CH$_2$)$_h$ wherein each R' is individually selected from the group consisting of hydrogen and an alkyl radical of 1 to 20 carbon atoms, wherein h is an integer of from 2 to 10;

(x) R"O(C$_2$H$_4$O)$_n$(C$_3$H$_6$O)$_m$(CH$_2$)$_p$—;

wherein n and m each have an average value of from 1 to 25 and p is an integer of from 2 to 6, and R" has the same meaning as R, above;

(xi) R"O(C$_2$H$_4$O)$_n$(CH$_2$)—;
(xii) R"O(C$_3$H$_6$O)$_m$(CH$_2$)—;

wherein in each case, n and m each have an average value of from 1 to 25 and p is an integer of from 2 to 6, and R" has the same meaning as R, above, and, (xiii) 2-phenylpropyl;

A is a hydrolytically stable divalent hydrocarbon radical attached to two silicon atoms by silicon-carbon bonds; a, b, c, d, e, f, and g have mole fraction values respectively ranging from 0-1, 0-1, 0-1, 0-0.75, 0-1, 0-3, and 0-3.

41. A method of preparing food for human consumption comprising oil and non-oil components comprising the steps of (I), preparing the non-oil components and (II) contacting the oil components with the non-oil components, wherein there is used as the oil component polyorganosiloxanes having an organic carbon content of at least fifteen weight percent, wherein the carbon is linked to silicon by silicon-carbon bonds; all molecular components of said polyorganosiloxanes having a molecular weight of at least 500 g/mole and having the general formula

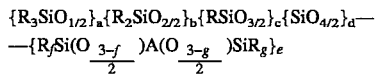

wherein each R is individually selected from the group consisting of (i) CH$_2$=CH—;
(ii)

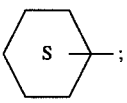

(iii) α—phenylethyl;
(iv) β—phenylethyl;
(v) alkyl groups of 1 to 20 carbon atoms;
(vi) hydrogen;
(vii) hydroxyl;
(viii) R'(CH$_3$)$_2$SiO—;
(ix) R'OOC(CH$_2$)$_h$ wherein each R' is individually selected from the group consisting of hydrogen and an alkyl radical of 1 to 20 carbon atoms, wherein h is an integer of from 2 to 10;

(x) R"O(C$_2$H$_4$O)$_n$(C$_3$H$_6$O)$_m$(CH$_2$)$_p$—;

wherein n and m each have an average value of from 1 to 25 and p is an integer of from 2 to 6, and R" has the same meaning as R, above;

(xi) R"O(C$_2$H$_4$O)$_n$(CH$_2$)—;
(xii) R"O(C$_3$H$_6$O)$_m$(CH$_2$)—;

wherein in each case, n and m each have an average value of from 1 to 25 and p is an integer of from 2 to 6, and R" has the same meaning as R, above, and, (xiii) 2-phenylpropyl;

A is a hydrolytically stable divalent hydrocarbon radical attached to two silicon atoms by silicon-carbon bonds; a, b, c, d, e, f, and g have mole fraction values respectively ranging from 0-1, 0-1, 0-1, 0-0.75, 0-1, 0-3, and 0-3.

42. A method as claimed in claim 41 wherein (I) a salad requiring an oil dressing is prepared and (II) the polysiloxane is contacted with the salad.

43. A method as claimed in claim 41 wherein (I) a food product requiring a shortening is prepared by mixing the ingredients for the food product absent the shortening, and (II) adding to the mixed food ingredients a polysiloxane oil as a substitute in whole or in part for the shortening normally required in the food product.

44. A method as claimed in claim 41 wherein (I) the polysiloxane oil and the food product are placed in a pan and (II) the food product is heated and cooked in the polysiloxane oil.

45. A method as claimed in claim 44 wherein the cooking oil is used to deep fry food.

46. A method as claimed in claim 45 wherein the deep fried food is potatoes.

47. A method as claimed in claim 45 wherein the deep fried food is fish.

48. A method as claimed in claim 45 wherein the deep fried food is chicken.

49. A method as claimed in claim 45 wherein the deep fried food is a snack food.

50. A method as claimed in claim 41 wherein the food is a confection.

51. A method as claimed in claim 50 wherein the confection is a chocolate drop.

52. A method as claimed in claim 50 wherein the confection is a candy.

53. A method as claimed in claim 52 wherein the candy is fudge.

54. A method as claimed in claim 50 wherein the confection is icing.

* * * * *